United States Patent
Sutton et al.

(10) Patent No.: US 6,915,112 B1
(45) Date of Patent: Jul. 5, 2005

(54) ACTIVE CANCELLATION TUNING TO REDUCE A WIRELESS COUPLED TRANSMIT SIGNAL

(75) Inventors: Todd Sutton, Del Mar, CA (US); Carlos Soledade, Encinitas, CA (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 09/711,159

(22) Filed: Nov. 12, 2000

(51) Int. Cl.[7] ............................................. H04B 17/00
(52) U.S. Cl. ................ 455/67.13; 455/69; 455/63.1; 455/115.3; 455/226.2; 455/305
(58) Field of Search ............................ 455/423, 425, 455/501, 63.1–67.7, 69, 115.1–115.4, 226.1–226.4, 302–307, 310, 24, 73, 296, 295, 305, 78

(56) References Cited

U.S. PATENT DOCUMENTS

| | | | | |
|---|---|---|---|---|
| 4,383,331 A | | 5/1983 | Davidson | |
| 4,475,243 A | * | 10/1984 | Batlivala et al. | ............... 455/22 |
| 4,660,042 A | * | 4/1987 | Ekstrom | ..................... 342/175 |
| 4,991,165 A | | 2/1991 | Cronyn | |
| 5,729,829 A | | 3/1998 | Talwar et al. | |
| 5,974,301 A | * | 10/1999 | Palmer et al. | ............. 455/63.1 |

FOREIGN PATENT DOCUMENTS

WO    WO 96/15596 A1    5/1996

* cited by examiner

*Primary Examiner*—Charles Craver
(74) *Attorney, Agent, or Firm*—James S. Finn

(57) ABSTRACT

An active cancellation controller receives a signal strength indicator that indicates a power level of a coupled signal from a local wireless transmitter at a local wireless receiver. The active cancellation controller tunes an active cancellation circuit to reduce the signal strength indicator. The active cancellation circuit is to generate a cancellation signal to combine with the coupled signal at the local wireless receiver.

10 Claims, 13 Drawing Sheets

FIG. 12

MACHINE READABLE MEDIUM
1220

MACHINE EXECUTABLE INSTRUCTIONS
1210

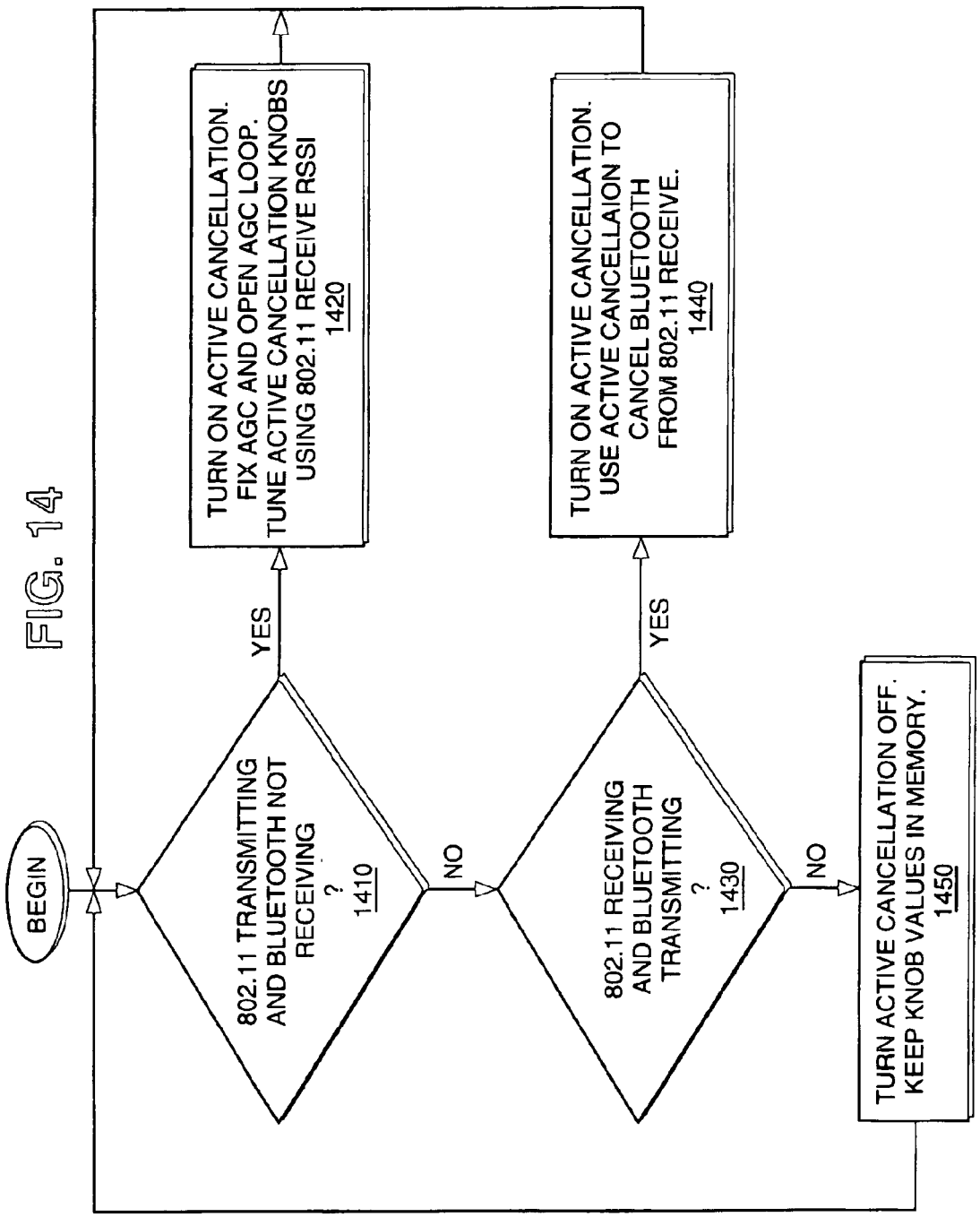

ACTIVE CANCELLATION TUNING TO REDUCE A WIRELESS COUPLED TRANSMIT SIGNAL

FIELD OF THE INVENTION

The present invention pertains to the field of wireless communications. More particularly, this invention relates to tuning active cancellation of wireless transmissions coupled in a wireless receiver.

BACKGROUND

Wireless communications offer increased convenience, versatility, and mobility compared to wireline alternatives. Cellular phones, wireless computer networking, and wireless peripheral components, such as a mouse, headphones, and keyboard, are but a few examples of how wireless communications have permeated daily life. Countless additional wireless technologies and applications are likely to be developed in the years to come.

Wireless communications use various forms of signals, such as radio frequency (RF) signals, to transmit data. A transmitter broadcasts a signal from an antenna in a particular frequency band. As the signal travels, the signal loses power or attenuates. The farther the signal travels, the more the signal attenuates.

The signal also encounters various forms of interference along the way that introduce noise in the signal. The transmitter itself introduces noise. Signals from other transmitters also introduce noise. A receiver trying to receive the signal is likely to introduce a comparative large amount of noise. Virtually anything can cause noise, including the ground, sky, sun, and just about any animate or inanimate object.

At some distance from the transmitter, the signal will attenuate to the point that it becomes lost in noise. When noise overpowers a signal, the signal and the data it is carrying are often unrecoverable. That is, depending on the distance a signal travels and the amount of noise mixed with the signal, a receiver may or may not be able to recover the signal.

Of particular concern is noise introduced in a receiver by a transmitter that is located in close proximity. The noise is called a coupled signal. A coupled signal may introduce so much noise that the receiver cannot receive any other signals. Signal coupling is a major obstacle in wireless communications. Devices that include both a transmitter and a receiver must isolate the transmitter from the receiver so that the coupled signal does not overpower the receiver.

One approach to isolating a transmitter from a receiver is half duplex communications. A half duplex device cannot simultaneously send and receive. A common example is a hand-held, two-way radio. When a user pushes a button to talk into the radio, the user cannot simultaneously listen to signals from other radios. That is, the receiver is disabled when the transmitter is transmitting. If the receiver were not disabled while the transmitter transmits, the transmitter would probably over power the receiver with noise.

Isolation is particularly troublesome in devices that include more than one on-board radio. For instance, a portable computer may include more than one radio to enable more than one simultaneous wireless service. A transmission from any one radio may over power receivers in multiple radios. One approach to isolating multiple transmitters from multiple receivers is time division duplex (TDD) communications. In a TDD device, all receivers are disabled when any one transmitter transmits.

A cellular phone, on the other hand, is a full duplex wireless communication device. That is, a cellular phone simultaneously transmits and receives signals so that a user can talk and listen at the same time. A cellular phone isolates its transmitter from its receiver by using two different frequency bands—one band for transmitting and one band for receiving.

None of these isolation solutions are particularly satisfying. Half duplex and TDD communications have the obvious disadvantage that a user cannot simultaneously send and receive. This poses a substantial performance limitation that will become more pronounced as more wireless communications applications and technologies are developed and adopted, and more devices include multiple on-board radios.

Full duplex communications that rely on two isolated frequency bands for sending and receiving data have the obvious disadvantage of using twice as much frequency bandwidth as half duplex communications. This poses a substantial performance limitation that will also become more pronounced as the numbers of competing wireless applications and users continues to increase, and available bandwidth continues to decrease.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

FIG. 12 illustrates one embodiment of a machine readable storage medium.

FIG. 14 demonstrates one embodiment of controlling active cancellation.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention reduces the noise effects of a transmitter located in close proximity to a receiver. Using various embodiments of the present invention, a wireless device can simultaneously transmit and receive, even within the same frequency band. This is a fundamental improvement over the prior art. For instance, where a cellular service provider has enough frequency bandwidth to serve one million prior art cellular phones using two frequency bands per phone, embodiments of the present invention may allow two million cellular phones to be served. Similarly, embodiments of the present invention allow multiple half duplex and/or full duplex radios to be isolated within a single device, even on the same chip.

As a practical matter, active cancellation generally cannot completely cancel a coupled signal. In which case, as used herein, "cancellation" refers to improved isolation. Active cancellation can, however, provide a substantial improvement in isolation between a transmitter and receiver. In practice, active cancellation has provided over 30 db of suppression and notches in excess of 100 MHz wide. These levels of performance can be achieved even for transmitters and receivers on the same chip, and for 2.4. GHz and 5 GHz radios.

Figure 1:
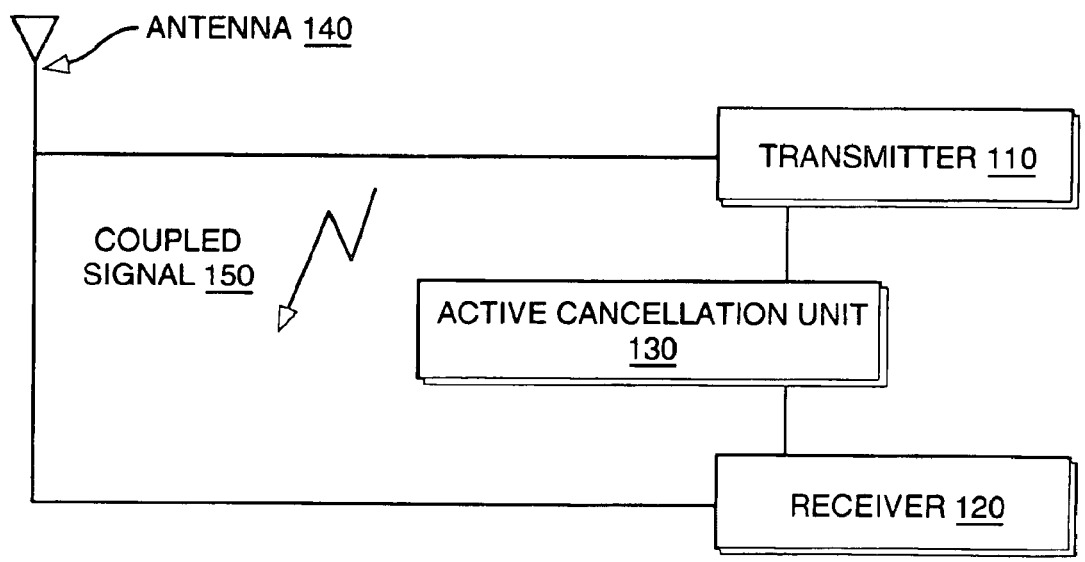
FIG. 1 illustrates one embodiment of the present invention.

FIG. 1 illustrates one embodiment of the present invention. Transmitter 110 transmits a signal from antenna 140. Receiver 120 receives a signal from antenna 140. If transmitter 110 is transmitting at the same time receiver 120 is receiving, the signal that receiver 120 receives includes a coupled signal 150 that could over power or at least reduce the effective range of receiver 120. Active cancellation unit 130 introduces a cancellation signal to reduce the coupled signal 150 at receiver 120. That is, the active cancellation unit 130 generates a cancellation signal that is combined with the input to receiver 120 and is intended to destructively interfere with coupled signal 150.

In general, the active cancellation unit 130 receives some indication of the power level at receiver 120 due to the coupled signal 150. For instance, a Received Signal Strength Indictor (RSSI) indicates the power level of the signal from the transmitter 110. The active cancellation unit 130 tunes the amount of active cancellation in various ways to reduce the power level. By tuning the active cancellation to reduce the power level of the coupled signal 150, the active cancellation unit also reduces the coupled signal itself.

Coupled signal 150 may be coupled into the received signal in any number of ways. For instance, if transmitter 110 and receiver 120 are on the same chip, coupled signal 150 may travel through a ground plan of the chip. Even if transmitter 110 and receiver 120 are physically isolated and use separate antennas, the coupled signal could pass from one antenna to the other.

In one embodiment, FIG. 1 represents a full duplex device such as a cellular phone. Using active cancellation, a full duplex device may be able to transmit and receive in the same frequency band. Of course, if the active cancellation unit 130 were to try to tune the active cancellation at the same time it was receiving another signal in the same frequency band, the power levels from the coupled signal and the other signal would combine. Tuning the active cancellation based on the combined signal would cancel both signals. Canceling the both signals is counter productive. The goal is to cancel the coupled signal and to let the other signal through.

In order to tune active cancellation to reduce the coupled signal without also canceling other in-band signals, the power level for the coupled signal needs to have some minimum signal to noise ratio. That is, for the purposes of tuning, any signals other than the coupled signal are noise. The power level of the coupled signal needs to be sufficiently larger than the power level of the noise in order to successfully tune the active cancellation.

Various embodiments of the present invention use a number of different approaches to achieve the signal to noise ratio needed for tuning active cancellation. For instance, in one embodiment, active cancellation is only tuned when the transmitter 110 is transmitting and the receiver 120 is not being used to receive other signals. Then, when the full-duplex radio is simultaneously sending and receiving, the active cancellation unit generates the cancellation signal based on the most recently tuned settings. The settings can be re-tuned, for instance, whenever the transmitter is transmitting and the receiver is not receiving other signals.

In alternate embodiments, as discussed below, the present invention can similarly be used to permit multiple separate radios to operate in close proximity, as in a single device. By reducing the coupled signal 150 among local radio components, multiple half-duplex and/or full duplex local radios may be able to operate simultaneously.

Figure 2:
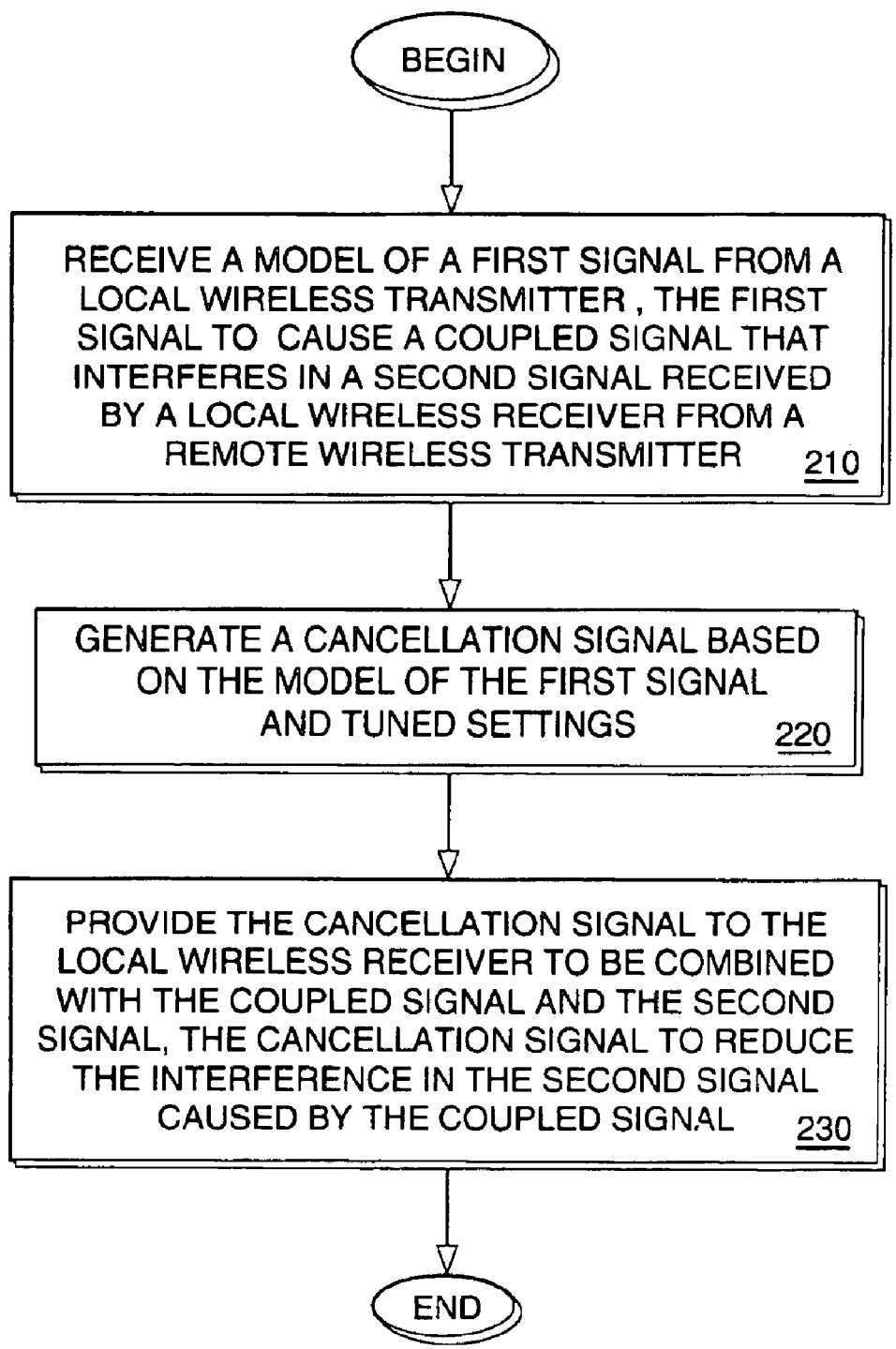
FIG. 2 demonstrates one embodiment of the present invention.

FIG. 2 demonstrates one embodiment of active cancellation unit 130. At 210, the active cancellation unit receives a model of a first signal that is being transmitted from the local transmitter, such as transmitter 110. A signal splitter can be used to split off part of the transmitter's output and provide a portion of the transmitted signal to the active cancellation unit. For instance, if the splitter splits off ten percent of the transmitter's output, the model of the first signal will be a one-tenth replica of the transmitters output signal. In alternate embodiments, any number of approaches can be used to provide a replica or copy of the transmitted signal to the active cancellation unit 130.

Meanwhile, the local receiver, such as receiver 120, is trying to receive a second signal from a remote transmitter. The first signal from the local transmitter causes interference, or noise, in the second signal received from the remote transmitter in the form of a coupled signal. The local receiver requires at least a certain minimum signal to noise ratio to be able to extract the second signal. The additional noise from the local transmitter may significantly reduce the signal to noise ratio at the local receiver.

At 220, an active cancellation unit, such as active cancellation unit 130, generates a cancellation signal based on the model of the first signal and based on tuned cancellation settings. As discussed below, the cancellation signal may be generated in a variety of different ways and the cancellation circuit may be tuned in a variety of different ways.

In general, creating the cancellation signal involves correlating the model of the first signal with the coupled signal at the receiver. That is, the coupled signal and the model of the first signal take different paths before reaching the active cancellation unit. The different paths may introduce different delays, phase shifts, and/or attenuations. The cancellation signal can be generated by delaying, phase shifting, and/or attenuating the model signal to create an inverted replica of the coupled signal as the coupled signal appears at the local receiver. Tuning the active cancellation involves determining appropriate amounts of delay, phase shift, and/or attenuation.

At 230, the active cancellation unit provides the cancellation signal to the local wireless receiver to be combined with the received signal. The cancellation signal destructively interferes with the coupled signal to reduce the noise level in the second signal caused by the first signal. A signal coupler can be used to combine the cancellation signal with the second signal. In alternate embodiments, any number of approaches can be used to combine the cancellation signal with the received signal.

The cancellation can be "adaptive" in that the cancellation circuit can be tuned frequently or at particular intervals so as to adapt to changes in the coupled signal. For instance, as objects move in the vicinity of the transmitter and receiver, or as the transmitter and receiver are moved or change frequency bands, the path loss for the coupled signal may change. By repeatedly tuning the signals, the cancellation can adapt to the changes.

Figure 3:
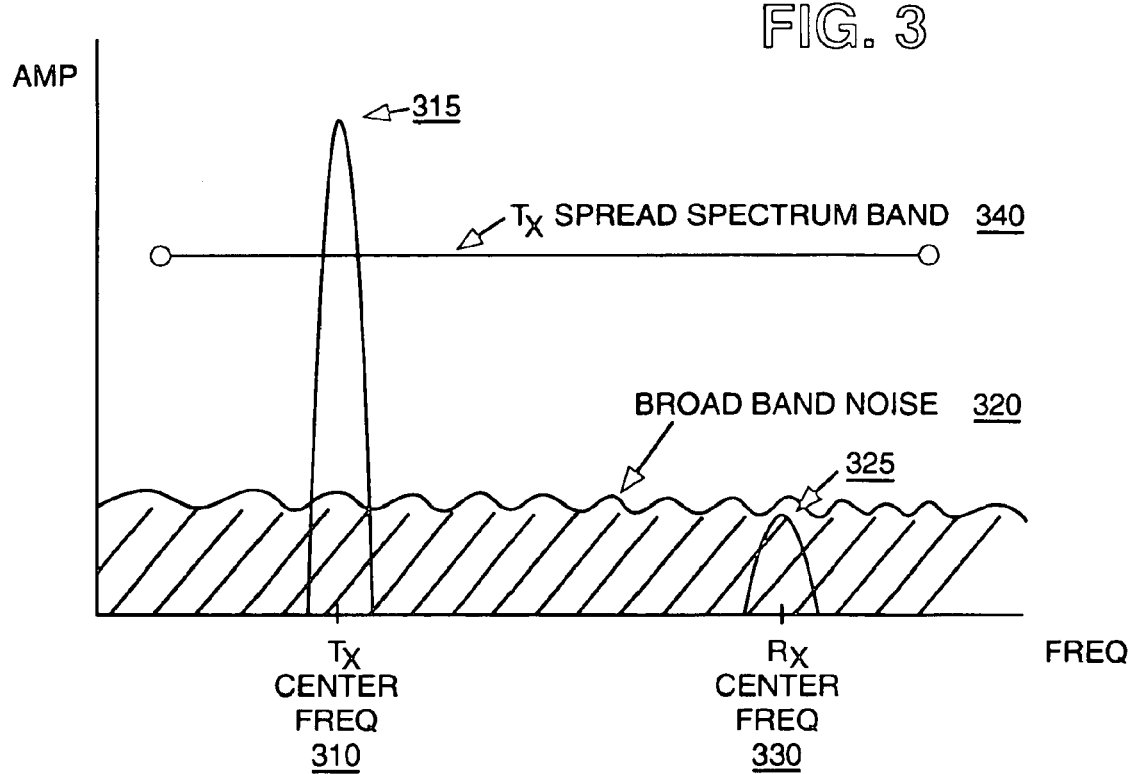
FIG. 3 illustrates one embodiment of a transmitted signal coupled with a received signal at a wireless receiver.

FIG. 3 illustrates one example of a coupled signal from a transmitter that is overpowering a receiver. In the illustrated embodiment, the transmitter is transmitting at center frequency 310 and the receiver is trying to receive a different signal 325 from a remote transmitter (not shown) at center frequency 330.

A center frequency is often the frequency of a carrier signal used by a transmitter or receiver. Information can be conveyed, for instance, by modulating the carrier's frequency and/or phase. A minimum frequency bandwidth is needed to either side of a center frequency. In alternate embodiments, any number of techniques can be used for wireless data transmission, such as amplitude modulation.

In the illustrated embodiment, the frequency bands for the transmitter and receiver do not overlap. The transmitted signal, however, includes both an intentional signal component 315 generated in the band around the center frequency 310 and a broadband noise component 320. The broadband noise 320 buries the signal from the remote transmitter. Virtually every transmitter generates noise because virtually every transmitter includes resistance and virtually every resistor generates noise.

The broad band noise is amplified along with the intentional signal component. The transmitter amplifies the signal to a comparatively high level because the signal attenuates as it travels. That is, in order for a receiver to receive the signal at some distant location, the signal must be amplified locally to a level above the amplitude needed at the remote receiver. The higher the amplification, the greater the range at which the signal can be recovered.

Conversely, the signal 325 that the local receiver is trying to receive also attenuates as it travels. Even if signal 325 was transmitted at a comparatively high amplitude, the signal may be considerably attenuated by the time it reaches the local receiver. In the illustrated embodiment, in the vicinity of the local transmitter the amplified noise is higher than the signal 325 from the remote transmitter, effectively burying the signal. If the remote transmitter were located closer so that the signal attenuated less, or if the remote transmitter transmitted at a higher amplitude, the signal to noise ratio at the local receive may be high enough to extract the signal. In other words, the signal coupling from the local transmitter, at the very least, reduces the range of reception for the local receiver.

Figure 4:
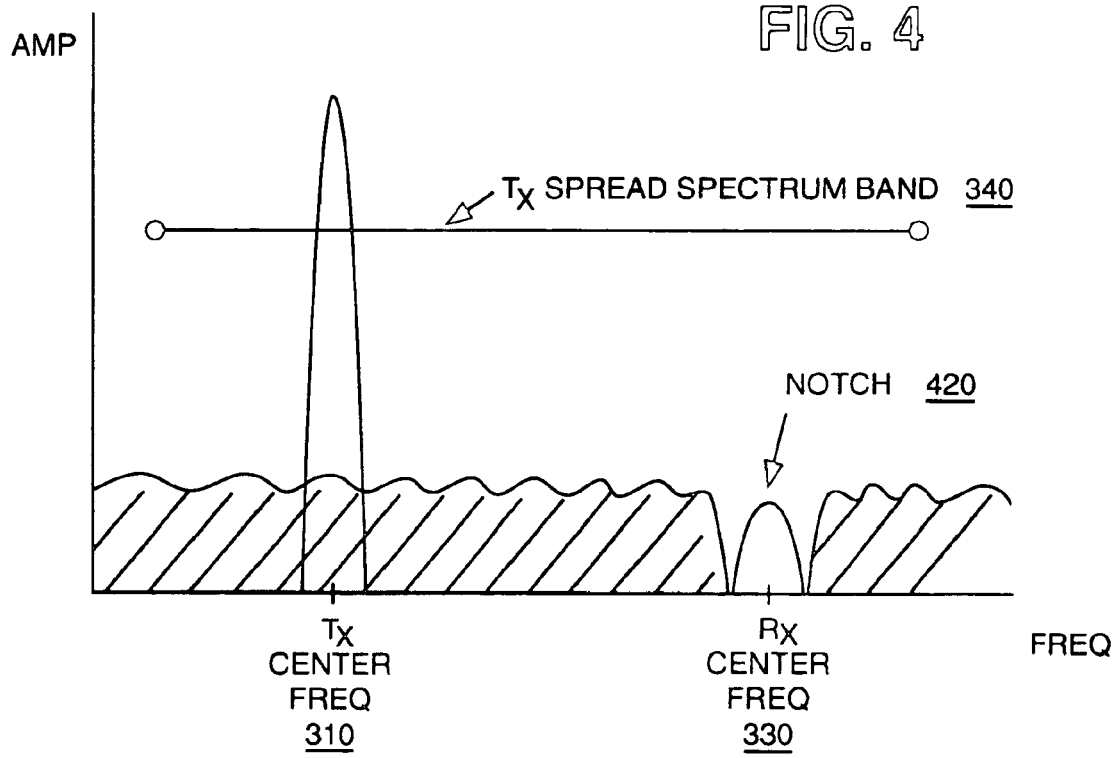
FIG. 4 illustrates one embodiment of narrow band active cancellation.

FIG. 4 illustrates one embodiment of active cancellation. In the illustrated embodiment, the active cancellation is narrow band, creating a notch 420 in the coupled signal. For instance, a narrow band active cancellation unit may use configurable delay paths and amplification to generate an inverted replica of the coupled signal. The cancellation unit can be tuned by adding or removing segments of delay so that the difference in delay between the cancellation signal and the coupled signal at the receiver is one half of a wavelength. Half of a wavelength is 180 degrees out of phase, so the cancellation signal destructively interferes with the coupled signal.

The cancellation, however, is fairly narrow because wavelength is a function of frequency. Configurable delay paths can only provide a 180 degree phase shift at one particular frequency. In other words, accuracy falls off at frequencies farther away from a center frequency. In which case, performing active cancellation at the center frequency of the transmitter would only improve the signal to noise ratio for the receiver if the receiver and transmitter were operating in the same frequency band. Therefore, as shown in FIG. 4, active cancellation is tuned to the center frequency of the local receiver.

Also illustrated in FIGS. 3 and 4 is the transmission spread spectrum band 340. A spread spectrum transmitter changes its transmission's center frequency at particular intervals. Spread spectrum transmitting is often used to improve security and/or reception. In the illustrated embodiment, the transmitter's center frequency 310 "hops" from one frequency to another within the spread spectrum band 340. Since the receiver's center frequency is also within the spread spectrum band 340, at some point the transmitter and receiver may operate at the same center frequency or their frequency bands may overlap. In which case, to the extent that the frequency bands of the transmitter and receiver overlap, active cancellation will cancel both the intentional signal component 315 and the broadband noise 320.

Conversely, when the receiver is a spread spectrum receiver, each time the receiver's center frequency hops, the active cancellation will need to be reconfigured. A spread spectrum receiver may frequency hop very quickly. As discussed below, configuration settings can be tuned for each possible frequency band of the receiver, stored in memory, and retrieved as the receiver changes frequencies.

Figure 5:
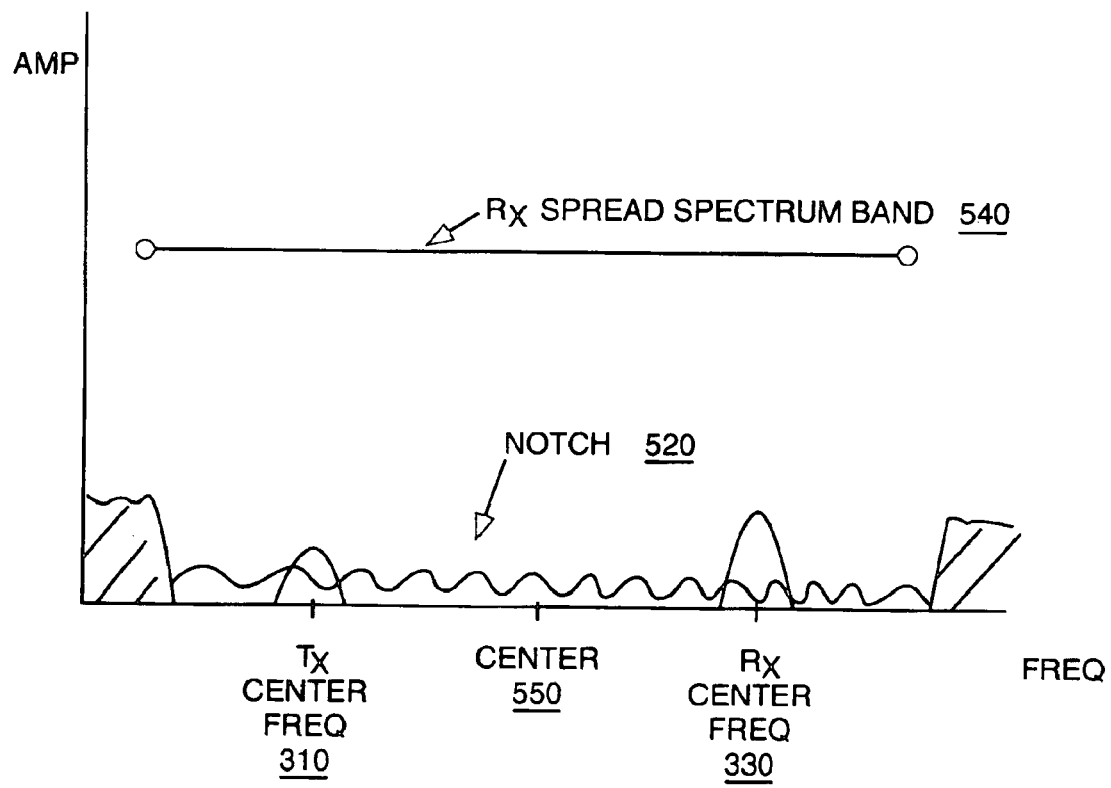
FIG. 5 illustrates one embodiment of wide band active cancellation.

FIG. 5 illustrates one embodiment of wide band active cancellation. In the illustrated embodiment, the receiver is a spread spectrum receiver and its center frequency hops over the receiver spread spectrum band 540. Ideally, wide band active cancellation provides a notch 520 in the coupled signal that is wide enough to encompass the entire receiver spread spectrum band 540. In which case, unlike narrow band active cancellation, wide band active cancellation would not require any reconfiguring as the receiver's center frequency hops because the coupled signal is cancelled everywhere the receiver is likely to go.

As discussed above, cancellation accuracy tends to fall off at frequencies further away from the center frequency. In which case, depending on the size of a spread spectrum band and the relative size of a notch, at least some reconfiguring may be necessary as the receiver frequency hops. That is, if the notch is wider than a single frequency bin of the spread spectrum receiver but too small to encompass the entire spread spectrum band, multiple frequency bins may map to a single set of configuration data, potentially reducing the rate at which the cancellation unit needs to be reconfigured.

Figure 6:
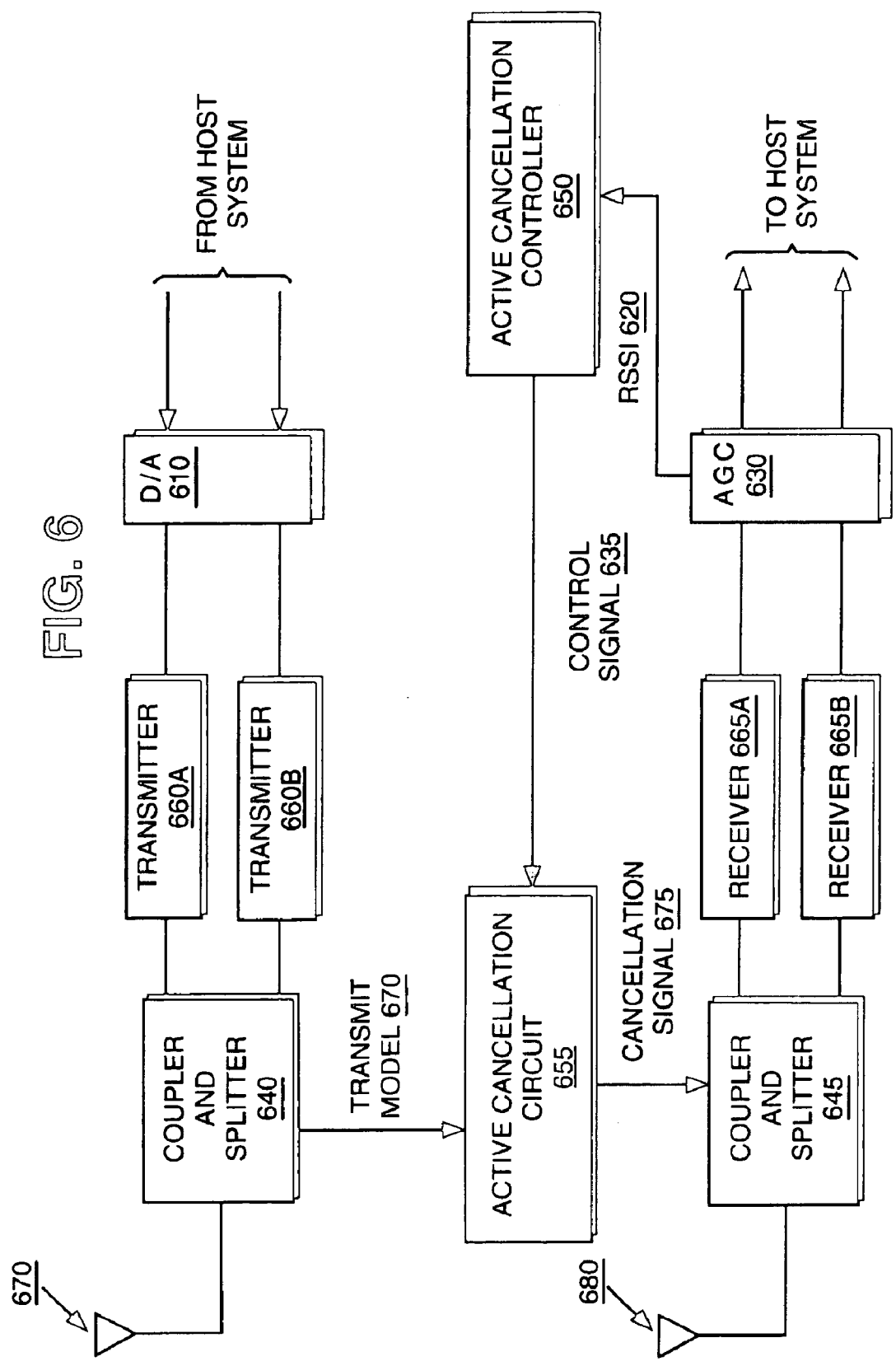
FIG. 6 illustrates one embodiment of the present invention for multiple radios.

FIG. 6 illustrates one embodiment of the present invention for isolating multiple radios in the same device or on the same chip. Transmitter 660A and receiver 665A form a first radio. Transmitter 660B and receiver 665B form a second radio. Both radios convert digital data from a host device (not shown) to analog data to be transmitted in analog form, and receive analog data from a remote device (not shown) and convert it to digital data for the host device. The active cancellation is provided by the active cancellation circuit 655 as controlled by the active cancellation controller 650.

The digital to analog converters 610 receive digital samples of a signal. In one embodiment, each digital sample represents an amplitude measurement of a low frequency analog signal, called a baseband signal, at a particular instant in time. In which case, the digital to analog converters generate an analog baseband signal from the samples. The baseband signal can carry data in any number of ways. For instance, data can be represented as amplitude, phase, and/or frequency modulations. The transmitters 660A and 660B can convert the baseband signal to a pass band high frequency carrier signal in any number of ways. For instance, in one embodiment, the transmitter can multiply, or "mix," the baseband signal up to the carrier signal frequency. On the receiver side of the radio, the process is reversed.

In one embodiment, both radios are on one or more PCMCIA cards for use in a laptop computer. For instance, both radios could be on the same card or the radios could be on separate cards in separate card slots. Card slots may be located in any number of positions in a laptop computer, including stacked and/or side-by-side. In alternate embodiments, the radios could be used in virtually any other device.

The first radio may be a Bluetooth compliant radio and the second radio may be an IEEE 802.11 compliant radio. Both radios can be used for wireless data communications and both radios can operate within the same general frequency range. One or both radios may have spread spectrum capability so that at some point in time the radios are likely to operate in the same frequency band.

In the illustrated embodiment, each radio is a half duplex device. That is, each radio cannot simultaneously send and receive. But, both radios can be used simultaneously. For instance, both radios may be able to receive at the same time, both radios may be able to send at the same time, and one radio may be able to receive while the other radio is sending.

This last situation, in which one radio is sending while the other is receiving, is essentially the same problem discussed above for the full duplex device. That is, when one transmitter transmits, it will generate a coupled signal that may over power the neighboring receiver, or at least reduce the receiver's reception range, unless the coupled signal is cancelled.

Coupler and splitter 640 combines signals from the transmitters and provides the transmitted signal to the antenna 670. Coupler and splitter 640 also splits off a percentage of the transmitted signal as a model 670 for active cancellation circuit 655. For instance, the splitter may be an unbalanced splitter which sends only a small percent of the signal off to the active cancellation unit.

Active cancellation circuit 655 generates a cancellation signal 675 by manipulating the delay, phase, and/or attenuation of the model 670 and combines the cancellation signal 675 with a received signal at coupler and splitter 645. Coupler and splitter 645 splits the combined signal and provides it to the receivers 665A and 655B. Automatic gain control amplifier (AGC) 630 includes digital to analog converters (not shown) to convert the combined signal to digital format for the host device.

The AGC 630 also provides an indication of the power level of the received signal, received signal strength indicator (RSSI) 620, to active cancellation controller 650. Based on the RSSI 620, the active cancellation controller 650 can tune the active cancellation circuit 655 using control signal 635. Tuning the cancellation circuit 655 varies the cancellation signal 675 to try to increase the destructive interference with the coupled signal from the transmitters.

As discussed above with respect to a full duplex device, if a receiver is receiving a signal from a remote device in the same frequency band as the coupled signal while tuning the active cancellation, the active cancellation will likely reduce both signals. As with the full duplex device, various embodiments of the present invention seek to provide the signal to noise ratio for the coupled signal that is needed to tune the active cancellation. That is, the active cancellation is tuned when the coupled signal is sufficiently larger than the surrounding noise so as to be recognized by the active cancellation controller 650.

Also as discussed above, active cancellation can be tuned to a center frequency of the receiver. That is, if the active cancellation circuit 655 cannot provide a wide notch in the noise, the cancellation should be focused around the center frequency of the receiver.

In one embodiment, both of these goals are achieved by tuning only when one radio's transmitter is transmitting, the radio's receiver is not being used to receive other signals, and the other radio's transmitter and receiver are off. Assuming a radio's transmitter and receiver operate at the same center frequency, which is generally the case for half duplex devices, the active cancellation will be tuned to the center frequency of the radio by tuning to the RSSI from the radio's own transmitter. Moreover, by only tuning when the radio's receiver is not actively receiving a signal from a remote transmitter and the other radio is off, the signal to noise ratio for the coupled signal from the radio's local transmitter should be sufficiently large.

When either receiver does begin to receiver a signal, or when the other radio's transmitter begins transmitting, the tuning stops. Then, if the two radios do begin to simultaneously send and receive, the active cancellation circuit 655 generates the cancellation signal 675 using the most recently tuned control signal 635.

The active cancellation controller 650 can retune to adapt to changes in the coupled signal. For instance, in one embodiment, the active cancellation is retuned whenever only one transmitter is transmitting. Alternately, the active cancellation controller 650 may force one or both of the radios into a tuning mode of operation at particular intervals or if a retuning opportunity does not present itself after a certain duration of time.

In alternate embodiments, the necessary signal to noise ratio may be attainable even when one or both receivers are actively receiving signals from remote transmitters when. That is, if the coupled signal is sufficiently larger than the received signal(s), tuning active cancellation may be possible. In alternate embodiments where the cancellation notch is larger, the active cancellation unit may also be able to tune active cancellation for multiple simultaneous transmitters. That is, if the cancellation notch is wide enough to encompass the center frequencies of multiple radios, active cancellation can be tuned based on multiple simultaneous transmissions.

Active cancellation circuit 655 may use any number of delay elements, phase shifters, and/or amplitude adjusters to generate the cancellation signal based on the mode 670. Examples of active cancellation circuits are described below with respect to FIGS. 7 and 8.

Figure 7:
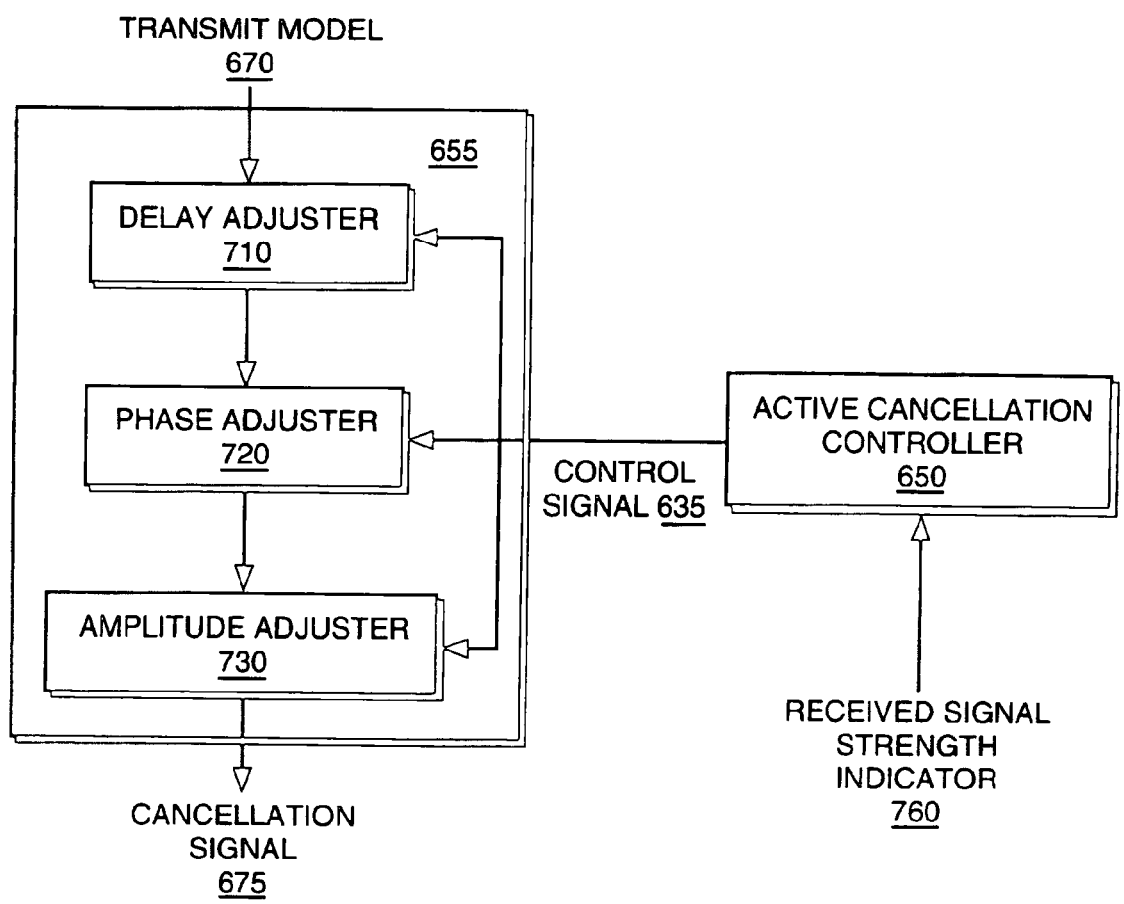
FIG. 7 illustrates one embodiment of the present invention for active cancellation in general.

FIG. 7 illustrates one embodiment of a generalized active cancellation circuit 655. In some respects, the illustrated embodiment resembles echo cancellation in wireline applications. In wireline echo cancellation, a full duplex device sends and receives signals over a wire in the same frequency band. From the perspective of the wireline device, the channel characteristics of the wire can be thought of in terms of a filter. A transmitted signal is sent out, passes through some filter which causes complex delay, phase, and amplitude changes, and comes back in the form of an echo to the receiver. Wireline echo cancellation tries to cancel the echo by reconstructing the channel characteristics of the hypothetical filter.

Echo cancellation, however, is unheard of, and is generally believed to be impossible, in wireless applications. The filter characteristics of a wire are generally fairly static, making the filter easier to construct. A wireless transmission medium is thought to more dynamic, making the filter harder to construct.

Moreover, wireline echo cancellation is performed at the baseband level because wireline applications do not use high frequency carrier signals in the same sense that wireless applications do. Wireless echo cancellation has to deal with broad band noise at the pass band level. That is, unlike a wireline application, a wireless transmitter receives a baseband signal and "mixes" it to produce a high frequency carrier signal. In the process of mixing the baseband signal, the transmitter generates considerable broad band noise. The broad band noise alone may be enough to overpower a coupled receiver in the pass band portion of the receiver before ever reaching the baseband portion.

For instance, a wireless receiver generally includes one or more low noise amplifiers (LNA) in the pass band portion of the receiver. An LNA amplifier is supposed to amplify a received signal so that, for instance, the signal is strong enough to be processed by other elements in the receiver. An LNA is designed to operate within a certain range of input power. A coupled signal from a neighboring transmitter may be so strong that it can exceed the acceptable input range of an LNA, effectively saturating the receiver in the pass band. In other words, baseband wireline echo cancellation techniques would often be useless in wireless applications because the problems begin to occur long before reaching the baseband.

Furthermore, given that the carrier frequency in wireless applications is generally very high relative to the data rate, or the rate of carrier modulations, channel characteristics for wireless active cancellation can generally be adequately modeled with a delay, phase, and amplitude adjustment. That is, the modulations of the carrier frequency change relatively slowly compared to the carrier frequency, so the wireless channel characteristics can be modeled with certain simplifications that are not possible in wireline applications without loosing significant data.

In the illustrated embodiment of FIG. 7, wireless active cancellation is performed using the three adjusters delay 710, phase 720, and amplitude 730, to generate cancellation signal 675 based on the transmit model 670. The active cancellation controller 650 receives the signal strength indictor 620, measures the indicated power level, and adjusts the elements of the cancellation unit accordingly. Based on differences in the power measurement over time, the active cancellation controller 650 tunes the elements of the cancellation circuit to reduce the strength indicator 620.

If the delay through the coupled path is short compared to the wavelength of the carrier modulations, the delay can be modeled as a phase shift, thereby eliminating the need for a separate delay adjustment. For instance, if the difference in the path delay for the coupled signal and the model of the transmitted signal is equal to a quarter of a wavelength, the shift between the signals remains within the same period or cycle. In which case, the coupled signal can be treated like a signal having different amplitude and phase, but is otherwise exactly the same as the transmitted signal.

Figure 8:
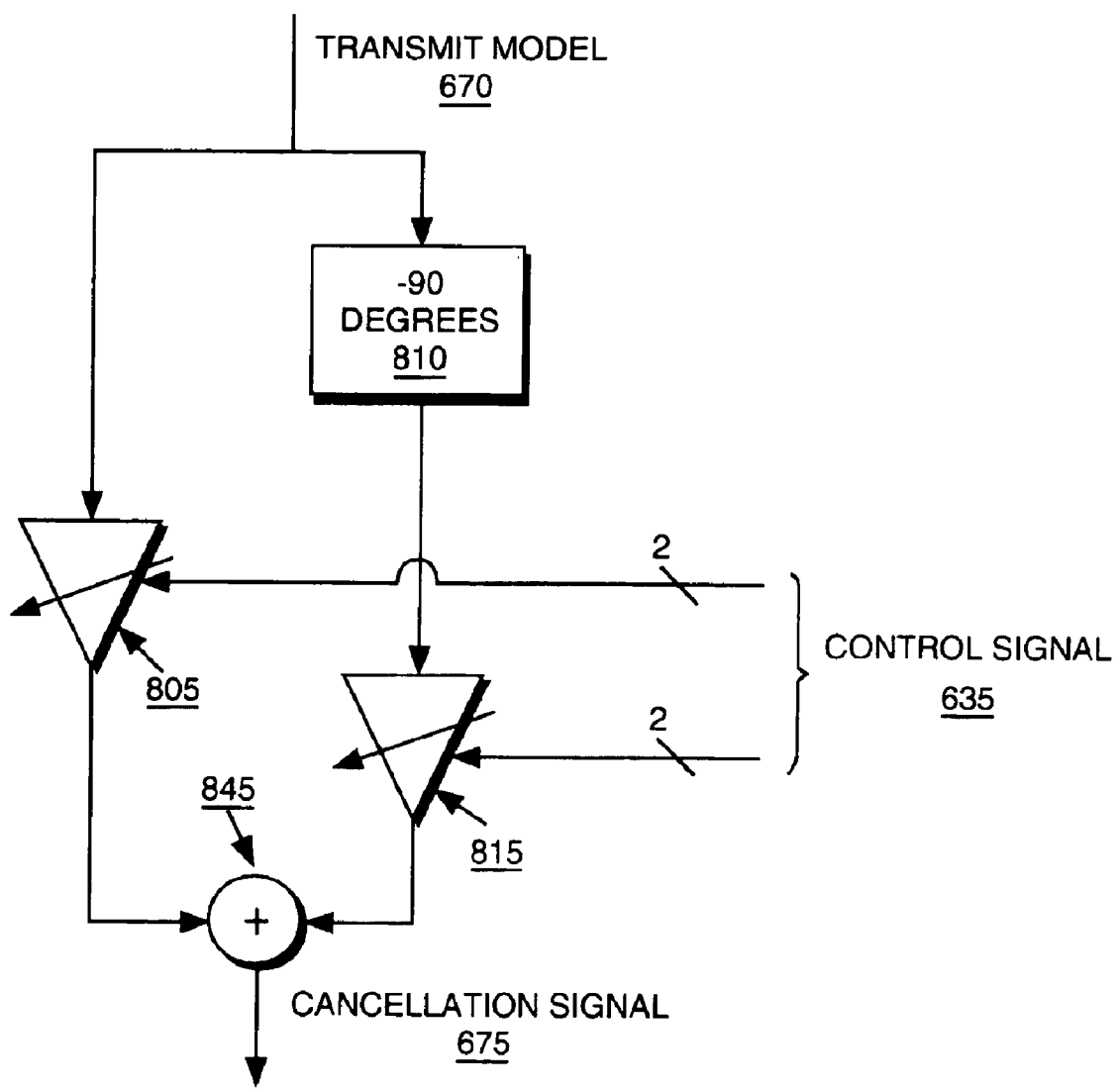
FIG. 8 illustrates one embodiment of an active cancellation circuit according to the teachings of the present invention.

FIG. 8 illustrates one embodiment of an active cancellation circuit in more detail. The adjustments to phase and amplitude are accomplished by two variable gain bi-phase attenuators 805 and 815, a −90 degree phase shifter 810, and a summer 845. The attenuators are "bi-phase" in the sense that they can amplify/attenuate both positive and negative. Phase shifter 810 provides a quadrature of the transmitted model 670.

A "quadrature" relates to a mathematical representation of a signal. A signal can be mapped at any instant in time to a quadrant of a plane based on the phase and magnitude of the signal. Each quadrant corresponds to a 90 degree phase of the signal. For instance, the first quarter of a signal's cycle may map to the first quadrant of the plane, the second quarter may map to the second quadrant, and so on. A quadrature of a signal maps to an adjacent quadrant of the plane but has essentially the same magnitude as the signal.

Signals can also be mapped at any instant in time to a complex plane having an axis corresponding to a real number component of the signal and an axis corresponding to an imaginary component of the signal. The signal that is not phase shifted can be mapped to one axis in the complex plane. The value of the signal can be positive or negative anywhere on that axis. The quadrature signal corresponds to the other axis in the complex plane. The value of the quadrature signal can be positive or negative anywhere on the second axis.

The attenuators 805 and 815 can be adjusted to positively or negatively amplify the model 670 and its quadrature up or down on their respective axes of the complex plane. The results from the attenuators are combined by summer 845. The combination of these two signals can produce a cancellation signal 675 in any of the four quadrants of the complex plane. For instance, combining a positive signal with a positive quadrature results in a signal in the first quadrant of the complex plane, combining a negative signal with a positive quadrature results in a signal in the second quadrant of the complex plane, and so on. Since all four quadrants are reachable, the cancellation circuit can perform a full 360 degree phase shift and the amplitude shift is only limited by the range of the attenuators.

The illustrated embodiment is particularly elegant. For instance, the only phase shift needed is a −90 degree phase shift which can be done over a comparatively wide frequency range with a comparatively high degree of accuracy. This is especially important for wider cancellation notches. Having only two variables also guarantees convergence to one solution. That is, the circuit implements a quadratic in the form of the variable gain of the two attenuators 805 and 815. Furthermore, modulation effects in the carrier signal are largely irrelevant. That is, it works for virtually any phase or frequency modulation of the carrier frequency.

Of course, any number of alternate approaches can be used. For instance, four phase shifters could be used to map to the for different quadrants and four variable, single-phase attenuators could be used to move the signals around in the various quadrants. As discussed above, a number of configurable delays and gains could also be used. In the illustrated embodiment of FIG. 8, a positive phase shift could be used instead of a negative phase shift to produce the quadrature signal.

Figure 9:
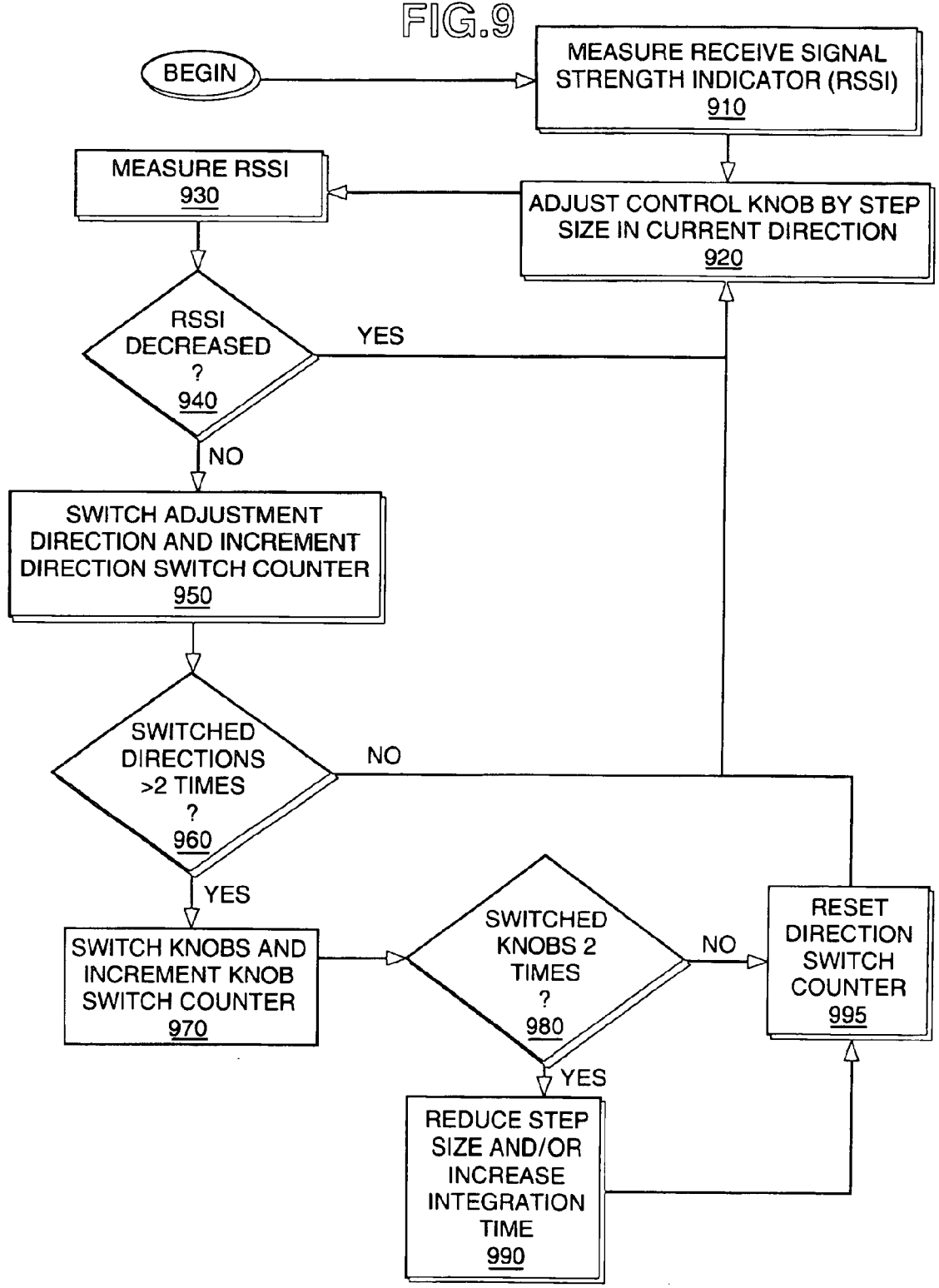
FIG. 9 demonstrates one embodiment of tuning active cancellation.

The active cancellation is tuned by the active cancellation controller 650. FIG. 9 demonstrates one embodiment of active cancellation tuning. In general, tuning the active cancellation involves measuring the power level, adjusting the active cancellation, and measuring the power level again to determine if the adjustment improved the cancellation or made it worse. Any number of approaches can be used. The illustrated embodiment includes a number of implementation specific details. Alternate embodiments may not include all the same elements, may include additional elements, and may perform elements in different orders.

The illustrated embodiment is directed to tuning a cancellation circuit like the one illustrated in FIG. 8. That is, the cancellation control signal consists of two control signals, or "knobs." Each knob controls one of the two attenuators. The process assumes that the RSSI level will be lowest for one particular combination of the two knob values. The RSSI level with respect to the values of the two nodes can be visualized like a plane with a gravity well or a funnel-shaped indentation. From any point on the plane, the RSSI level slops down into the center of the gravity well. One knob corresponds to values along one axis of the plane and the other knob corresponds to values along the other axis of the plane. If a first knob is held constant and the other knob is adjusted incrementally across the plane, the RSSI level will decrease up to a point and then begin to increase. If the second knob is then held constant where the RSSI level was lowest for the second knob and the first knob is adjusted incrementally across the plane in the orthogonal direction, the RSSI level will continue to decrease up to a point and then begin to increase. This process zeros in on the center of the gravity well and approaches the lowest possible RSSI level.

Specifically, in FIG. 9 at block 910, the receive signal strength indicator (RSSI) is measured. As discussed above, the RSSI needs a certain signal to noise ratio to be recognizable over the surrounding noise. One approach to improving the signal to noise ratio is to integrate the RSSI measurement over time. That is, rather than taking a measurement at an instant in time during which a spike in the noise may overwhelm the RSSI signal, the values are accumulated for a period of time. Assuming that, on average, the RSSI is larger than the noise, the difference between the accumulated RSSI and noise will increase over time. The longer the integration period, the larger the difference gets. In one embodiment, the measurement integrates over 100 micro seconds.

At block 920, one of the control knobs is adjusted by a certain step size and in a particular direction. For instance, in a digital implementation, the knob settings may be eight bit values having a range from negative 128 to positive 128. An initial step size may be 10. An initial direction for adjustments may depend on initial values for the knobs. For instance, if the knobs start at zero, it probably does not matter whether the knobs are initially adjusted up to positive 10 or down to negative ten. If the knobs start out at the negative end of the range, however, then the direction for adjustments should normally be positive.

At block 930, the RSSI is measured again. If the RSSI decreased in 940, then the adjustment is assumed to have been in the right direction so the process loops back to make another adjustment in the same direction at block 920. Assuming the knob started out at one end of its range, the process is likely to loop through several iterations of adjustments in one direction before the RSSI increases compared to the previous measurement.

When the RSSI does increase in block 940 compared to the previous measurement, the last adjustment is assumed to have been in the wrong direction so the direction for future adjustments is switched at block 950 and a counter is incremented to track how many times the direction has been switched. At block 960, the first time the direction switches, the process just loops back to block 920 again to adjust the knob in the other direction. The process may adjust the knob in the backwards direction for one or two iterations, but once the RSSI level increases again at block 940, the direction of further adjustments is again switched. This process of going back and forth over the lowest measured RSSI value is repeated until, in block 960, the process recognizes that it has switched directions more than two times based on the direction switch counter. When it has switched directions more than two times, the process assumes the RSSI level has been reduced as much as possible with the current knob. Alternate embodiments may switch directions more or fewer times depending, for instance, on where the knob was initially set.

At block 970, the process holds the last value for the first knob and switches to tuning the second knob. The process also increments a counter to track how many times it has switched knobs. At block 980, if the process has not switched knobs two times, it goes on to block 995 to reset the counter for the number of times the direction indicator has been switched. From there, the process loops back to block 920 to begin tuning the second knob much like the first knob was tuned. That is, the second knob is adjusted in one direction in blocks 920, 930, and 940 until the RSSI level increases compared to the previously measured RSSI value. Then, the direction is switched in block 950 and adjustments are made in the opposite direction until the direction is switched again. This proceeds until the second knob is adjusted back and forth over the lowest RSSI level a couple of times.

Once the direction for the second knob has changed more than two times at block 960, the process switches knobs for a second time. This time through block 980, the process diverts through block 990 and reduces the step size and/or increases the integration time prior to returning to perform another iteration of adjustments and measurements. That is, at this point, the process has zeroed in pretty close to the lowest possible RSSI value. In order to get closer, the process can reduce the step size and continue searching at a smaller granularity. For instance, the initial step size of 10 can be used to quickly approach the lowest RSSI, and then the step size may be reduced to 1 to continue the search and get even closer.

The integration time needs to be longer when the RSSI signal to noise ratio is smaller. That is, out on the fringes of the hypothetical RSSI gravity well, the RSSI signal is strong so the signal to noise ratio is high. The process may only need to integrate over 10 micro seconds to get a good RSSI measure when the knobs are out on the fringes. As the knobs zero in on the gravity well and the RSSI signal is reduced, the signal to noise ratio also decreases. Noise may start to dominate the RSSI as the RSSI gets smaller and smaller. In which case, as the process zeros in on the lowest RSSI, the process may increase the integration time to improve measurement accuracy.

Of course, over time the hypothetical gravity well may move around. For instance, moving the radios or moving objects around the radios may change the transmission path characteristics for the coupled signal. In which case, the process can loop back through, first adjusting one knob and then the other to repeatedly zero in on the lowest RSSI level.

In various alternate embodiments, the process may include several different step sizes, different step sizes for different knobs, and/or integration lengths to more finely tune the cancellation over time. Alternate embodiments may also increase the step size and/or decrease integration time under certain circumstances where, for instance, there has been drastic change in the position of the lowest RSSI and the process wants to quickly re-approach the new position.

Figure 13:
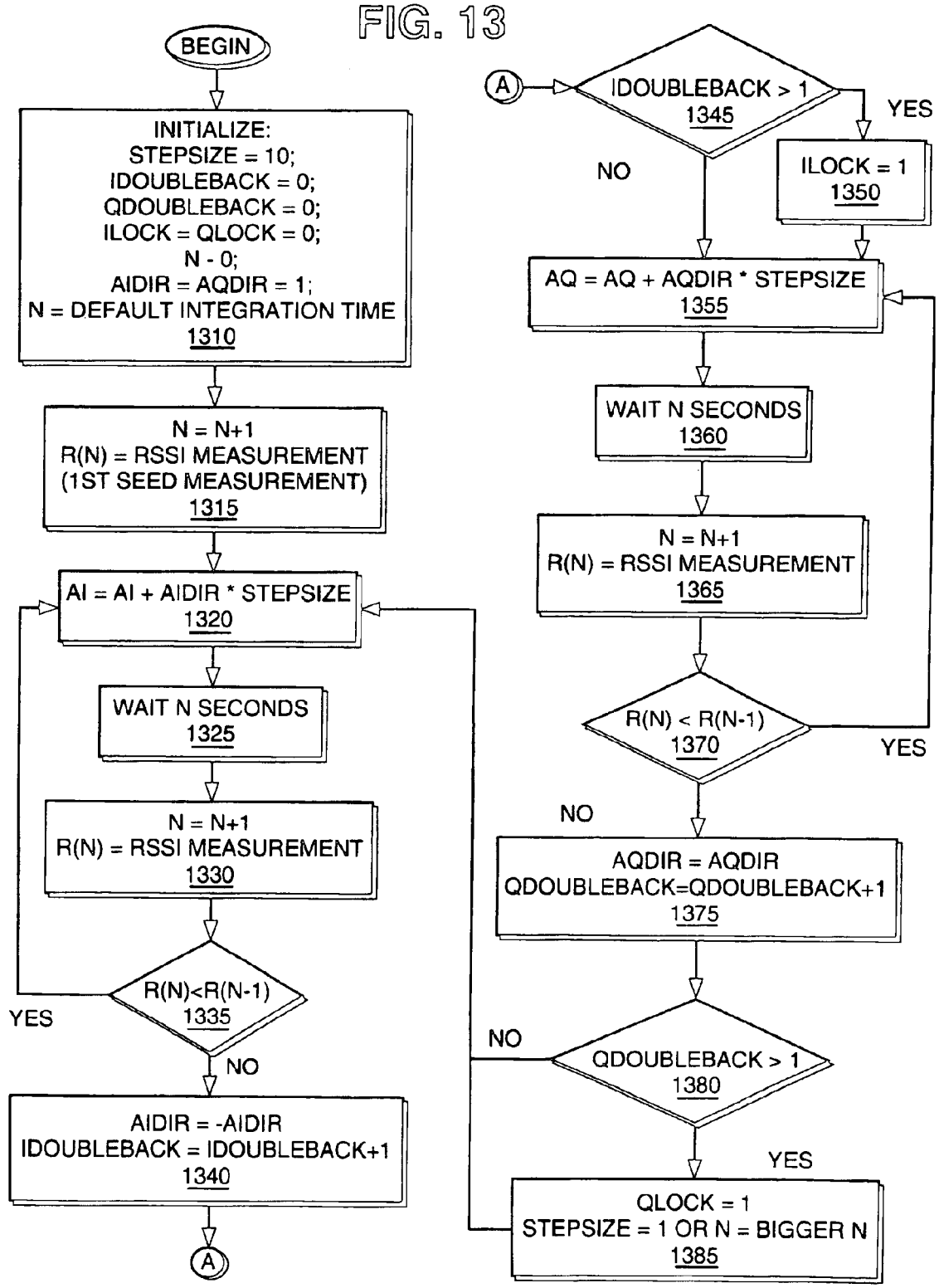
FIG. 13 demonstrates one embodiment of tuning active cancellation.

Skipping to FIG. 13, FIG. 13 demonstrates another particular embodiment of the tuning algorithm. The illustrated embodiment performs essentially the same function as the embodiment of FIG. 9, but includes some additional and different details. Specifically, in block 1310, a number of variables are initialized. The two adjustment knobs are labeled Ai and Aq. The variables include an initial StepSize of 10, separate variables IdoubleBack and QdoubleBack to track how many times the process switches the direction of adjustment for the respective knobs, separate variable Ilock and Qlock to indicate when a respective knob has zeroed in on the lowest RSSI level, a variable n to differentiate different RSSI measurements, separate variables AiDir and AqDir to indicate the current direction of adjustments for respective knobs, and a variable N to indicate the integration time for RSSI measurements.

At block 1315, an initial RSSI measurement, or "seed" measure is taken. At block 1320, the Ai knob is adjusted by the StepSize amount and in the AiDir direction. At block 1325, the process integrates over N seconds and, in block 1330, takes the next RSSI measurement. At block 1335, if the current measure is lower than the previous, the process loops back to block 1320 to continue adjusting in the same direction. If at block 1335 the current measure is not lower, the direction for future adjustment of the Ai knob is reversed and the IdoubleBack counter is incremented. If IdoubleBack is greater than 1, Ilock is set in 1350. If IdoubleBack is not greater than 1, Ilock is not set.

At this point, the process diverges slightly from the one illustrated in FIG. 9. In FIG. 9, the process continues to adjust one knob until it locks at approximately a lowest RSSI level. In the embodiment of FIG. 13, the process proceeds to adjust the second knob before the first knob locks.

Continuing with FIG. 13, at block 1355, the Aq knob is adjusted by the step size amount and in the direction indicated by AqDir. At 1360, the process integrates for N seconds, and at block 1365 takes another RSSI measurement. If the RSSI has decreased in block 1370, the process loops back to block 1355 to continue adjusting the Aq knob in the indicated direction and step size. If the RSSI has increased at block 1370, the direction AqDir is switched and QdoubleBack is incremented in block 1375. At block 1380, if QdoubleBack is greater than one, Qlock is set and either the StepSize is reduced to 1 or the integration time N is set to a bigger value before looping back to block 1320 to continue tuning. If QdoubleBack is not greater than one, the process loops back to block 1320 to continue tuning at the initial StepSize and integration time N.

Figure 10:
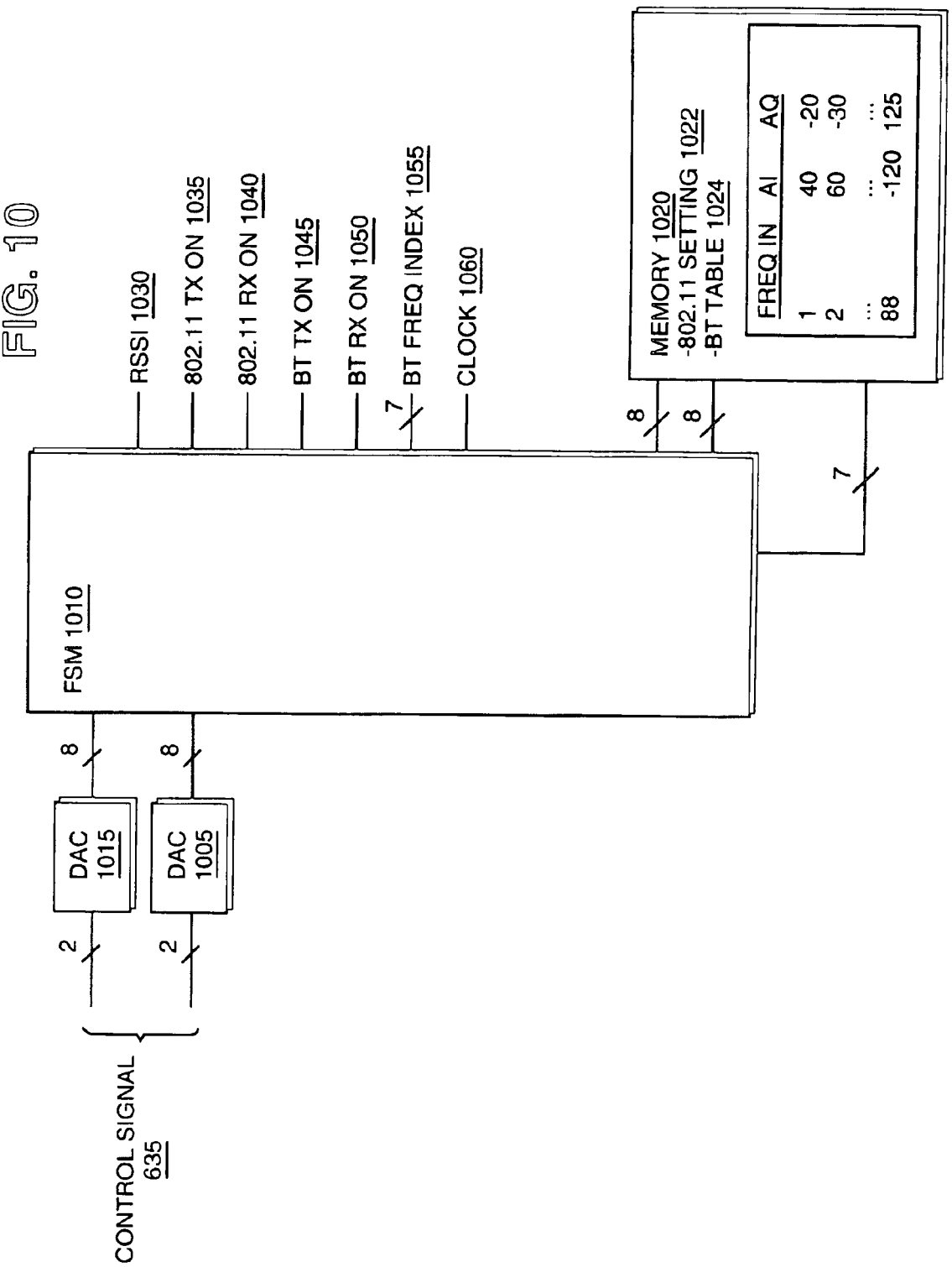
FIG. 10 illustrates one embodiment of an active cancellation controller according to the teachings of the present invention.

Skipping back to FIG. 10, FIG. 10 illustrates one embodiment of a digital active cancellation controller. The illustrated embodiment includes a number of implementation specific details. Other embodiments may not include all the illustrated elements, may include additional elements, and may include elements arranged in different configurations. In alternate embodiments, the functions of the circuit can be carried out in software, as discussed below with respect to FIGS. 11 and 12, in analog circuit, etc.

The illustrated embodiment includes a finite state machine (FSM) 1010. The FSM 1010 performs various functions and processes such as those described above with respect to FIG. 9. In the illustrated embodiment, the control circuit generates control signal 635 for active cancellation between an 802.11 radio and a Bluetooth radio. The FSM 1010 receives a number of inputs including RSSI 1030, 802.11 transmission indicator 1035, 802.11 receive indicator 1040, Bluetooth transmission indicator 1045, Bluetooth receive indicator 1050, Bluetooth frequency index 1055, and clock 1060 for measuring time.

In order to tune active cancellation for receiving 802.11, the FSM 1010 performs a tuning function such as those described above with respect to FIG. 9 or 13. In one embodiment, the FSM 1010 only tunes for receiving 802.11 when the indicators indicate that the 802.11 transmitter is on and everything else is off. That is, as discussed above, in order to achieve the needed signal to noise ratio and to tune to the 802.11 center frequency, tuning may be limited to this situation. As discussed above, in alternate embodiments where the notch is wide enough, the integration time is long enough, etc., the FSM 1010 may tune when both transmitters are transmitting, when both receivers are receiving, etc.

The 802.11 settings 1022 are stored to memory 1020. If and when the indicators indicate that 802.11 is receiving and Bluetooth and/or 802.11 are transmitting, the FSM 1010 can retrieve the settings from memory. In the illustrated embodiment, the FSM 1010 uses a seven bit index to identify the appropriate settings in the memory. Also in the illustrated embodiment, each setting is stored as an eight bit byte, one byte for each knob. The settings are provided to digital to analog converters 1005 and 1015 to be converted to analog signals for the active cancellation circuit (not shown). In this particular implementation, the analog signals are sent using differential pairs to reduce susceptibility to interference.

As with tuning to receive 802.11, tuning to receive Bluetooth may be limited to times when only the Bluetooth transmitter is on and everything else is off due to signal to noise and notch size considerations. Alternately, as discussed above, depending on various factors, the control circuit may be able to tune to receive Bluetooth when multiple transmitters and/or receivers are on.

Tuning active cancellation for receiving Bluetooth is generally more complicated than tuning for receiving 802.11. This is because Bluetooth has spread spectrum capability. The Bluetooth center frequency can hop among about 88 different frequency bins as indicated by the Bluetooth frequency index 1055. In order to tune active cancellation to the receiver's center frequency, tuning settings need to be generated for each frequency bin. In the illustrated embodiment, the settings are stored in Bluetooth table 1024 in memory 1020. A seven bit index indicates which bin is being tuned or from which bin the FSM 1010 should retrieve settings when Bluetooth is receiving and 802.11 and/or Bluetooth are transmitting.

As described above, each control setting is stored as an 8 bit byte in the table. Any number of alternate embodiments can be used to store a table of tuning settings for a spread spectrum receiver. In the illustrated embodiment however, the FSM 1010 populates the Bluetooth table by performing a tuning function such as those described in FIG. 9 or 13 for each frequency bin. Since only one frequency bin will be active at any one time, the FSM 1010 will need to keep track of where it is in each tuning process. For instance, every time the frequency index 1055 changes, the FSM 1010 will retrieve the most recent settings from the table 1024, perform one or two measurements and adjustments before the frequency index changes, write back the updated settings, and repeat for the next frequency index. In alternate embodiments where the notch size is large enough to cover multiple frequency bins in a spread spectrum receiver, settings for multiple bins can be consolidated.

Skipping to FIG. 14, FIG. 14 demonstrates one embodiment of an active cancellation controller for actively canceling Bluetooth from 802.11. A similar approach could be used for actively canceling 802.11 from Bluetooth. In the illustrated embodiment, at block 1410 the process determines whether or not the 802.11 transmitter is transmitting and at the same time the Bluetooth receiver is not receiving.

If so, the process has identified an opportunity to tune active cancellation. That is, the signal to noise ratio is likely to be large enough to enable active cancellation. In which case, the controller turns active cancellation on for tuning using a process such as those described above with respect to FIGS. 9 and 13.

The controller also fixes the automatic gain control amplifier (AGC) for the 802.11 receiver when tuning active cancellation. The AGC, under normal circumstances, measures RSSI to determine the signal strength from a remote transmitter and then generates a feedback signal to instruct the remote transmitter to increase or decrease the power level of its transmission. When tuning active cancellation, however, the process is focused on the coupled signal from the local transmitter, not a remote transmitter. So, there is no need to generate a feedback signal. Therefore, the AGC level is fixed and the feedback loop is "opened" to prevent feedback signals from being generated.

If an opportunity for tuning active cancellation is not identified in block 1410, the controller disables active cancellation in block 1450, and loops back to continue monitoring for opportunities. As discussed above, depending on the needed signal to noise ratio, the size of the notch, and other factors, alternate embodiments may identify additional opportunities to tune and/or apply active cancellation.

Figure 11:
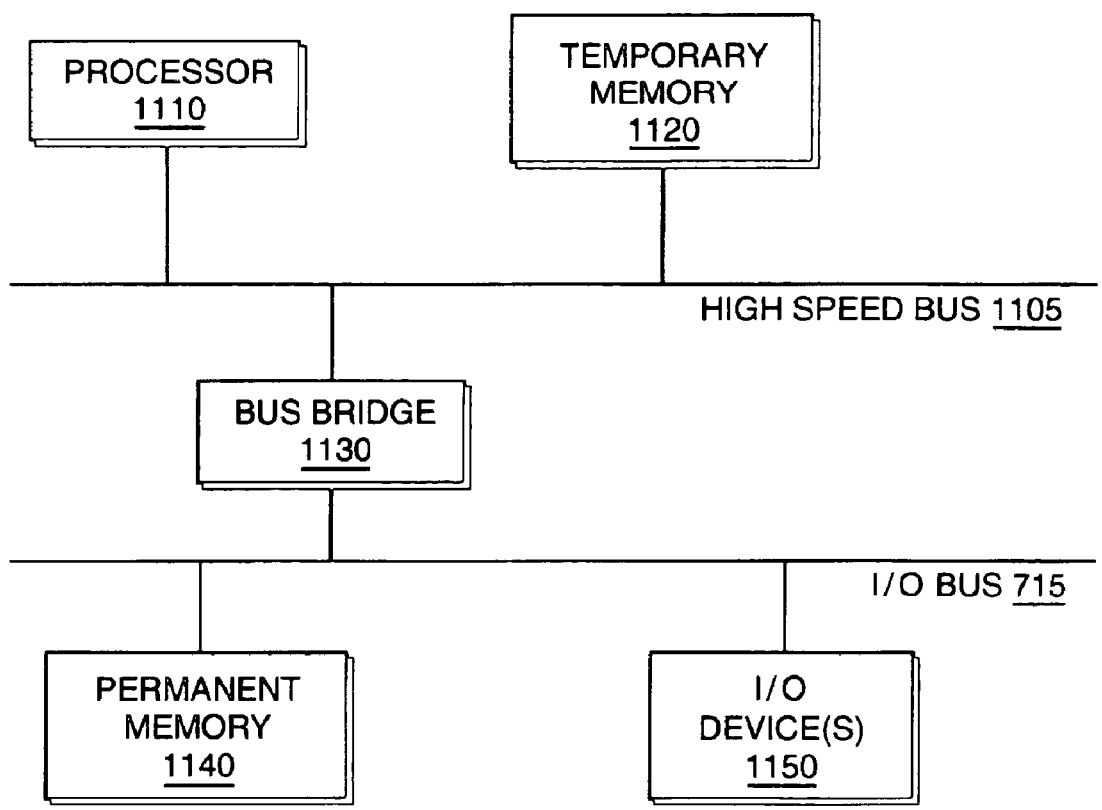
FIG. 11 illustrates one embodiment of a hardware system.

Skipping back to FIG. 11, FIG. 11 illustrates one embodiment of a hardware system intended to represent a broad category of computer systems such as personal computers, workstations, and/or embedded systems. In the illustrated embodiment, the hardware system includes processor 1110 coupled to high speed bus 1105, which is coupled to input/output (I/O) bus 1115 through bus bridge 1130. Temporary memory 1120 is coupled to bus 1105. Permanent memory 1140 is coupled to bus 1115. I/O device(s) 1150 is also coupled to bus 1115. I/O device(s) 1150 may include a display device, a keyboard, one or more external network interfaces, etc.

Certain embodiments may include additional components, may not require all of the above components, or may combine one or more components. For instance, temporary memory 1120 may be on-chip with processor 1110. Alternately, permanent memory 1140 may be eliminated and temporary memory 1120 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 11. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 1140.

Alternately, as shown in FIG. 12, the software routines can be machine executable instructions 1210 stored using any machine readable storage medium 1220, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 1150 of FIG. 11.

From whatever source, the instructions may be copied from the storage device into temporary memory 1120 and then accessed and executed by processor 1110. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a method and apparatus for tuning active cancellation of a wireless transmitted signal coupled in a wireless received signal is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   receiving a signal strength indicator that indicates a power level of a coupled signal from a local wireless transmitter at a local wireless receiver; and
   tuning an active cancellation circuit to reduce the signal strength indicator, said active cancellation circuit to generate a cancellation signal to combine with the coupled signal at the local wireless receiver, wherein the tuning the active cancellation control signal further comprises:
   measuring a first level of the signal strength indicator;
   adjusting an active cancellation control signal in a first direction; measuring a second level of the signal strength indicator;
   further adjusting the active cancellation control signal in the first direction if the second level is lower than the first level; and
   adjusting the active cancellation control signal in an opposite direction if the second level is higher than the first level; and
   iteratively measuring the signal strength indicator and either further adjusting the active cancellation control signal or adjusting the active cancellation control signal in the opposite direction depending on a comparison of a current measurement of the signal strength indicator and a previous measurement of the signal strength indicator;
   wherein the active cancellation control signal locks after adjustment of the active cancellation control signal has switched directions at least twice.

2. A method comprising:
   receiving a signal strength indicator that indicates a power level of a coupled signal from a local wireless transmitter at a local wireless receiver; and
   tuning an active cancellation circuit to reduce the signal strength indicator, said active cancellation circuit to generate a cancellation signal to combine with the coupled signal at the local wireless receiver, wherein the tuning the active cancellation control signal further comprises:
   measuring a first level of the signal strength indicator;
   adjusting an active cancellation control signal in a first direction; measuring a second level of the signal strength indicator;
   further adjusting the active cancellation control signal in the first direction if the second level is lower than the first level; and
   adjusting the active cancellation control signal in an opposite direction if the second level is higher than the first level; and
   iteratively measuring the signal strength indicator and either further adjusting the active cancellation control signal or adjusting the active cancellation control signal in the opposite direction depending on a comparison of a current measurement of the signal strength indicator and a previous measurement of the signal strength indicator;
   wherein the active cancellation control signal comprises a first dimension control signal, and wherein tuning the active cancellation signal further comprises:
   iteratively measuring the signal strength indicator and either adjusting a second dimension control signal in the first direction or adjusting the second dimension control signal in the opposite direction depending on a comparison of a current measurement of the signal strength indicator and a previous measurement of a signal strength indicator.

3. The method of claim 2 wherein the method further comprises:
   switching from tuning the first dimension control signal to tuning the second dimension control signal when the first dimension control signal locks; and
   switching from tuning the second dimension control signal to tuning the first dimension control signal when the second dimension control signal locks.

4. A method comprising:
   receiving a signal strength indicator that indicates a power level of a coupled signal from a local wireless transmitter at a local wireless receiver; and
   tuning an active cancellation circuit to reduce the signal strength indicator, said active cancellation circuit to generate a cancellation signal to combine with the coupled signal at the local wireless receiver, wherein the tuning the active cancellation control signal further comprises:
   measuring a first level of the signal strength indicator;
   adjusting an active cancellation control signal in a first direction; measuring a second level of the signal strength indicator;
   further adjusting the active cancellation control signal in the first direction if the second level is lower than the first level; and
   adjusting the active cancellation control signal in an opposite direction if the second level is higher than the first level; and
   iteratively measuring the signal strength indicator and either further adjusting the active cancellation control signal or adjusting the active cancellation control signal in the opposite direction depending on a comparison of a current measurement of the signal strength indicator and a previous measurement of the signal strength indicator;
   wherein the active cancellation control signal is initially adjusted by a first step size and adjusted by a smaller step size once the active cancellation control signal has locked at least once.

5. A method comprising:
   receiving a signal strength indicator that indicates a power level of a coupled signal from a local wireless transmitter at a local wireless receiver; and
   tuning an active cancellation circuit to reduce the signal strength indicator, said active cancellation circuit to generate a cancellation signal to combine with the coupled signal at the local wireless receiver, wherein the tuning the active cancellation control signal further comprises:
   measuring a first level of the signal strength indicator;
   adjusting an active cancellation control signal in a first direction; measuring a second level of the signal strength indicator;
   further adjusting the active cancellation control signal in the first direction if the second level is lower than the first level; and
   adjusting the active cancellation control signal in an opposite direction if the second level is higher than the first level; and iteratively measuring the signal strength indicator and either further adjusting the active cancellation control signal or adjusting the active cancellation control signal in the opposite direction depending on a comparison of a current measurement of the signal strength indicator and a previous measurement of the signal strength indicator;

wherein the signal strength indicator is initially measured over a first integration time and measured over a longer integration time once the active cancellation control signal has locked at least once.

6. A method comprising:

receiving a signal strength indicator that indicates a power level of a coupled signal from a local wireless transmitter at a local wireless receiver;

tuning an active cancellation circuit to reduce the signal strength indicator, said active cancellation circuit to generate a cancellation signal to combine with the coupled signal at the local wireless receiver; and enabling tuning only when the local wireless transmitter is an only local wireless transmitter that is transmitting and when the local wireless receiver is not being used to receive a signal from a remote transmitter.

7. A method comprising:

receiving a signal strength indicator that indicates a power level of a coupled signal from a local wireless transmitter at a local wireless receiver;

tuning an active cancellation circuit to reduce the signal strength indicator, said active cancellation circuit to generate a cancellation signal to combine with the coupled signal at the local wireless receiver wherein tuning the active cancellation circuit comprises making adjustments to an active cancellation control signal, the method further comprising:

detecting when at least one local wireless transmitter is transmitting and the local wireless receive is being used to receive a signal from a remote transmitter; and providing the active cancellation control signal at a particular level.

8. The method of claim 7 wherein the particular level of the active cancellation control signal comprises a most recently tuned level.

9. The method of claim 7 wherein providing the active cancellation control signal at the particular level comprises:

identifying a center frequency of the local wireless receiver; and retrieving the particular level of the active cancellation signal from a memory location corresponding to the center frequency of the local wireless receiver.

10. The method of claim 9 wherein providing the active cancellation control signal at the particular level further comprises:

identifying additional center frequencies of the local wireless receiver as the local wireless receiver frequency hops; and retrieving additional particular levels of the active cancellation control signal from additional memory locations corresponding respective ones of the additional center frequencies.

* * * * *